United States Patent [19]

Borst

[11] 4,157,961
[45] Jun. 12, 1979

[54] COMBINED WASTE WATER CLARIFICATION AND TRASH DISPOSAL SYSTEM

[76] Inventor: Adolf H. Borst, Schloss Rämsberg, 7322 Donzdorf, Fed. Rep. of Germany

[21] Appl. No.: 753,402

[22] Filed: Dec. 22, 1976

[51] Int. Cl.² .............................................. C02C 5/02
[52] U.S. Cl. ......................................... 210/33; 210/35; 210/40; 210/73 S; 210/265; 210/275; 210/284
[58] Field of Search ................... 210/27, 30 R, 33, 39, 210/40, 44, 47, 66, 67, 69, 71, 73 R, 73 S, 80, 82, 83, 184, 265, 269, 270, 271, 274, 275, 276, 284, 286, 332, 333 R, 152, 35

[56] References Cited

U.S. PATENT DOCUMENTS

| | | | |
|---|---|---|---|
| 1,432,351 | 10/1922 | McGahan | 210/286 |
| 1,937,481 | 11/1933 | Raisch et al. | 210/67 |
| 2,246,224 | 6/1941 | Streander | 210/152 |
| 3,425,936 | 2/1969 | Culp et al. | 210/73 S |
| 3,622,509 | 11/1971 | Shaler | 210/39 |
| 3,655,046 | 4/1972 | Trussell | 210/73 S |
| 3,741,890 | 6/1973 | Smith et al. | 210/73 S |
| 3,783,128 | 1/1974 | Thompson | 210/27 |
| 3,994,804 | 11/1976 | Kalvinskas et al. | 210/67 |
| 3,998,731 | 12/1976 | Franzen et al. | 210/33 |
| 4,010,098 | 3/1977 | Fassell | 210/73 S |
| 4,025,426 | 5/1977 | Anderson et al. | 210/40 |

Primary Examiner—Charles N. Hart
Assistant Examiner—Ivars Cintins
Attorney, Agent, or Firm—Townsend and Townsend

[57] ABSTRACT

Polluted waste water is combined with preferably shredded trash including organic trash components to form a water-trash mixture from which inorganic substances such as sand are initially gravitationally setted out and removed. The trash-water mixture is then passed into a roughing filter constructed of a plurality of individual, replaceable filter elements stocked with non-activated carbon to remove floating and suspended particulate matter from the mixture. Thereafter, the water is flowed through a fine filter, also constructed of individual filter elements but stocked with activated carbon for the removal of remaining particulate matter as well as dissolved substances. The filter elements are intermittently regenerated by heating the coal and the residue deposited thereon under an oxygen deficiency to degas organic matters of the residue and form additional filter carbon, both non-activated and activated carbon. Trash may further be separately incinerated, also under an oxygen deficiency to generate heat for the degassing process and to generate additional combustible gas which is used to drive motors or turbines for generating electricity. Motor exhaust gas is used to predry the carbon in filter elements about to be regenerated by passing the gas through the elements. This also removes particulate contaminants from the exhaust gas which is thereafter finish scrubbed by passing it through the incoming water prior. A preferred high temperature activated carbon filter backwashing method employing heat from the exhaust gas is also described.

46 Claims, 9 Drawing Figures

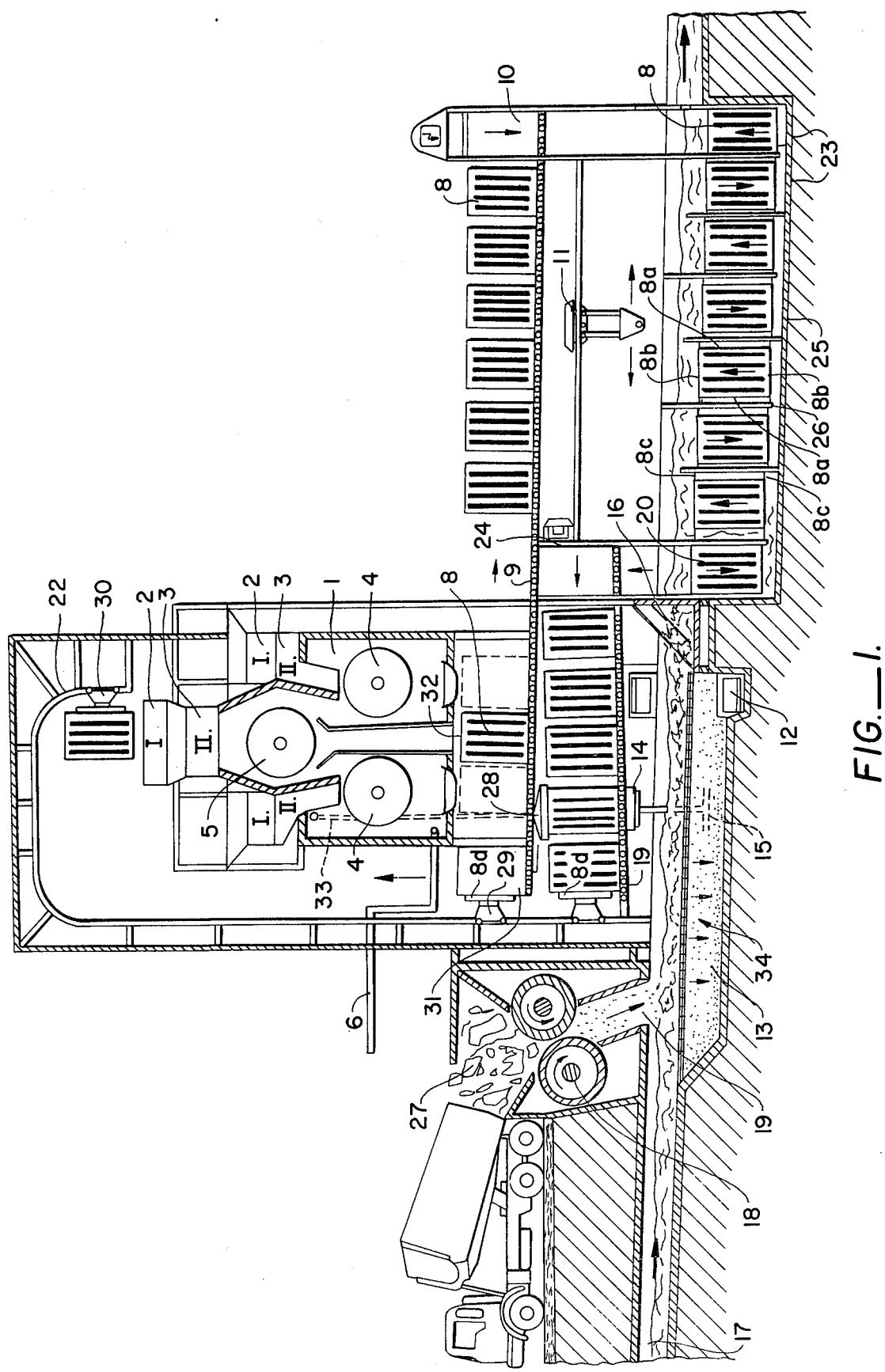
FIG._1.

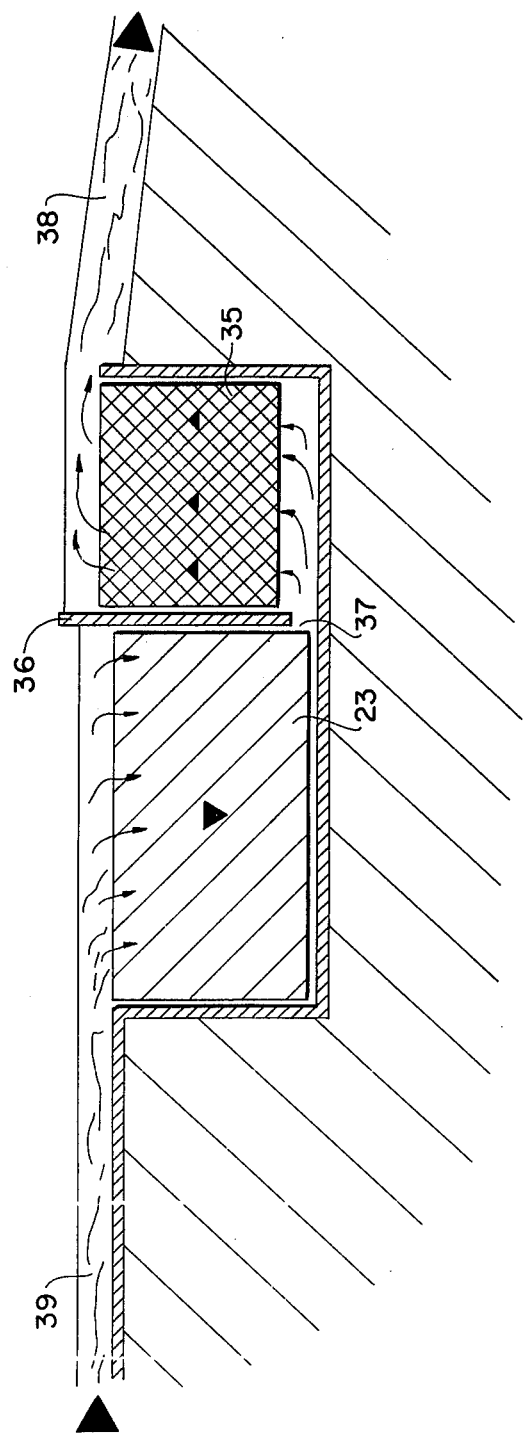

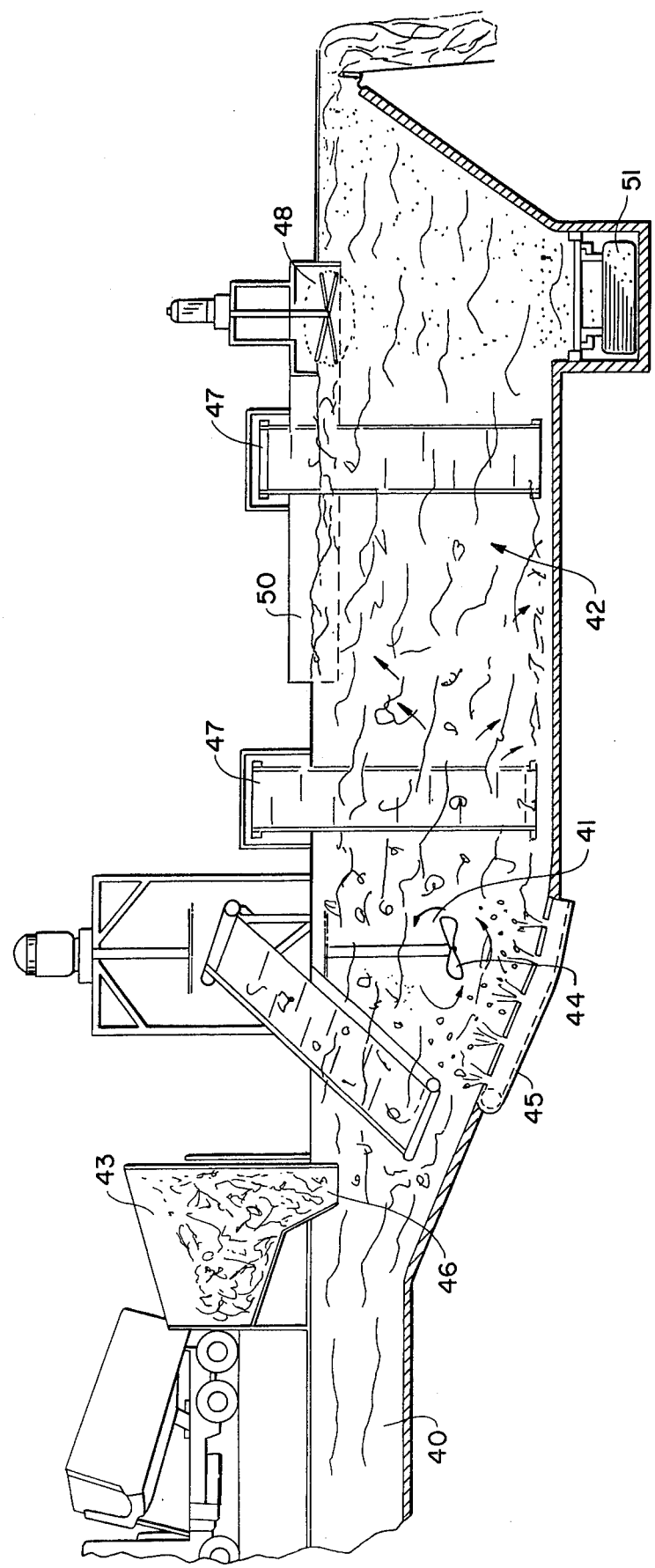
FIG._3.

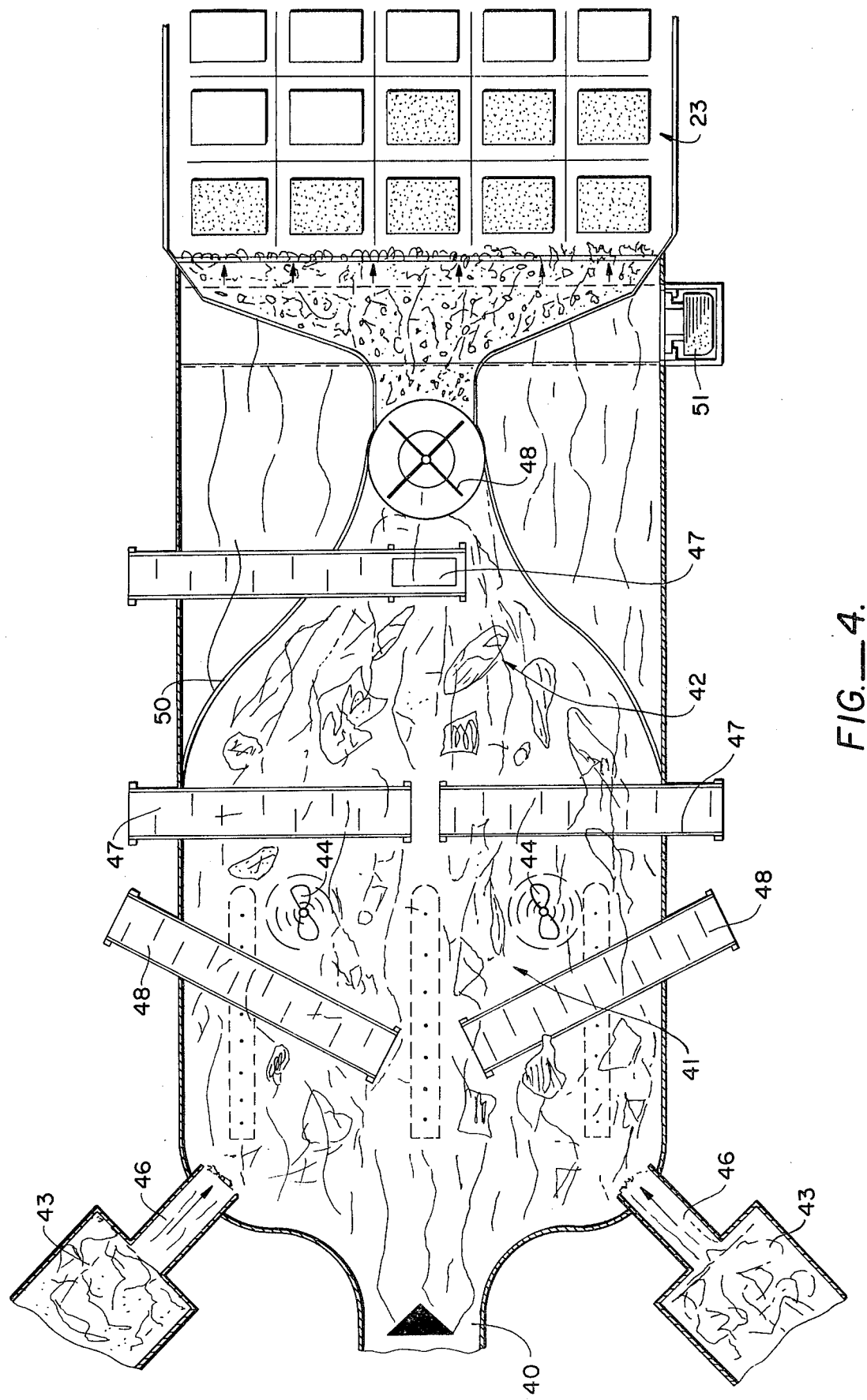
FIG._4.

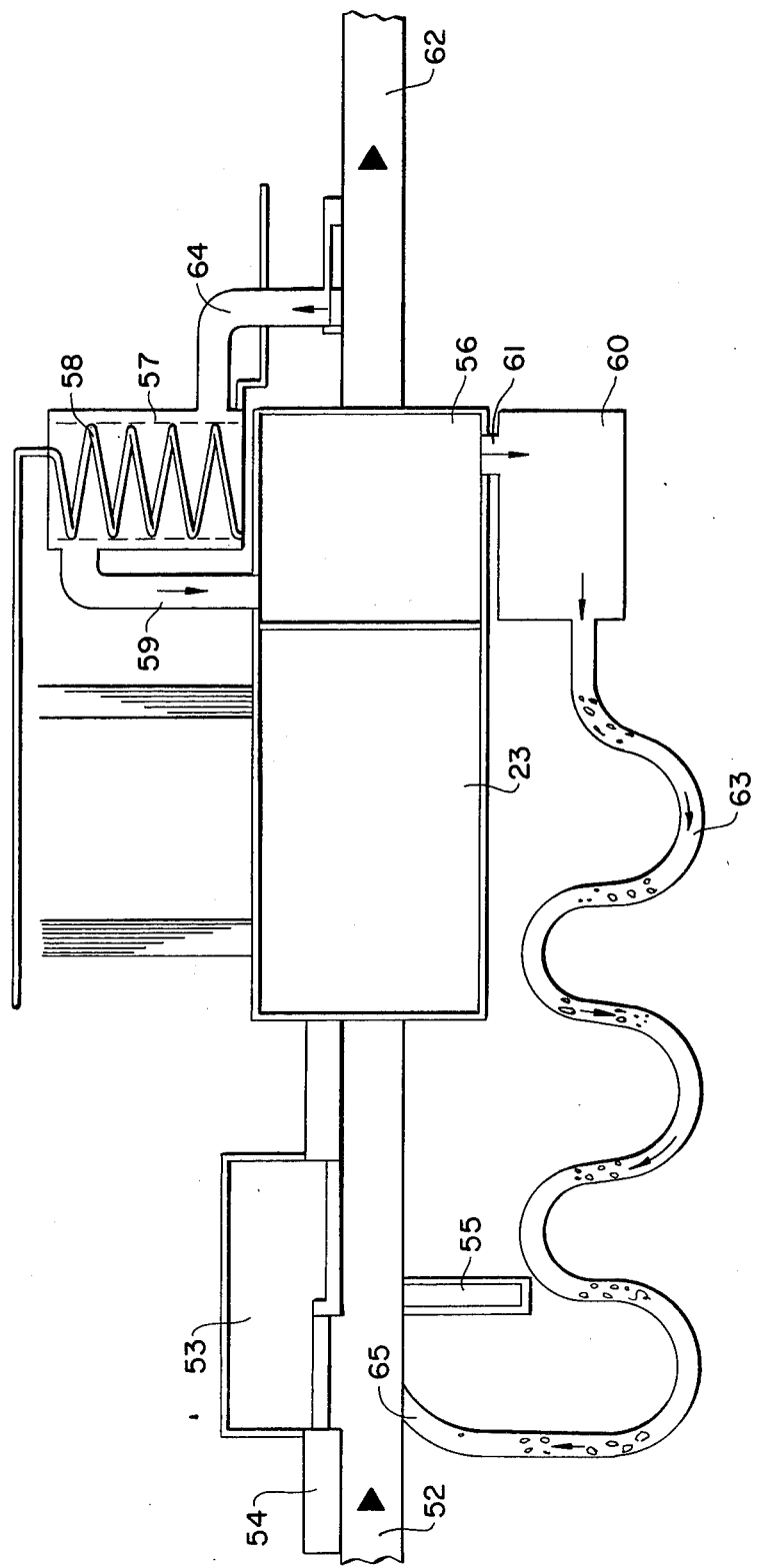
FIG._5.

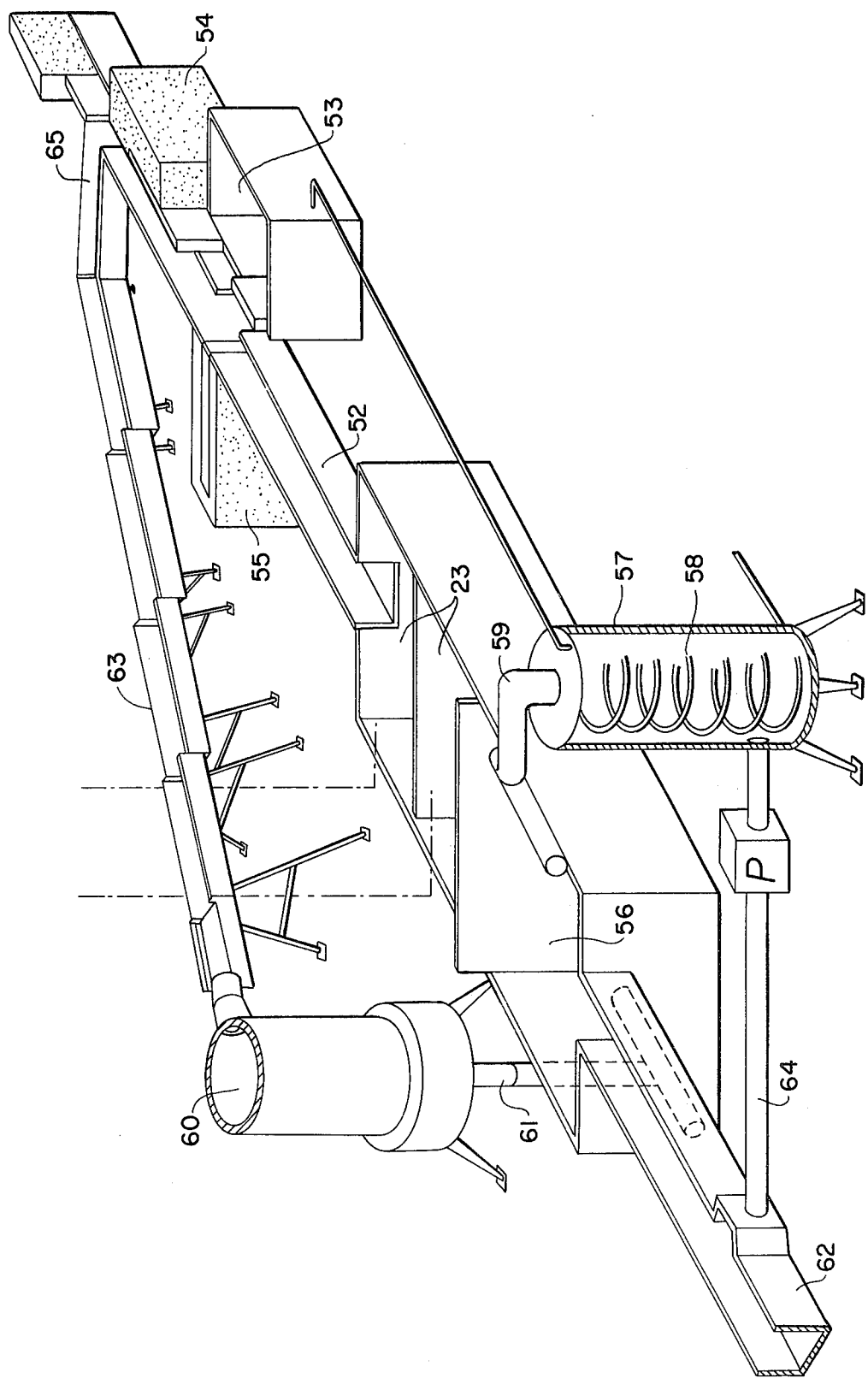
FIG._6.

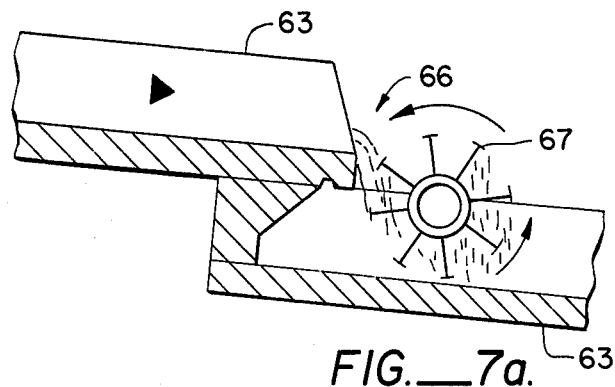
FIG.__7a.
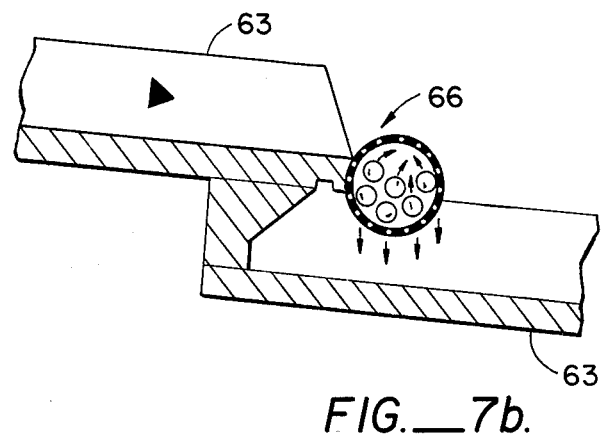
FIG.__7b.
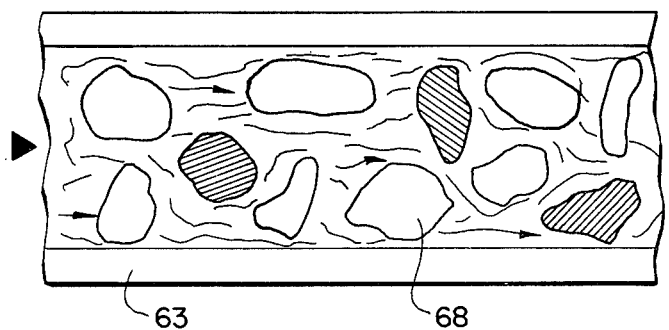
FIG.__7c.

COMBINED WASTE WATER CLARIFICATION AND TRASH DISPOSAL SYSTEM

BACKGROUND OF THE INVENTION

Water is one of the most important life sustaining elements on earth, it is both necessary and irreplaceable.

The natural global water circulation maintains water in continuous motion. On each day an average of about 875 billion m$^3$ water evaporate from the oceans into the atmosphere. Approximately 775 billion m$^3$ return to the oceans in the form of rain. The remaining 100 billion m$^3$ precipitate over land masses.

Approximately 75 billion m$^3$ of water evaporate from land masses and they combine with the 100 billion m$^3$ evaporated from the oceans and return in the form of rain to the land masses. Approximately 100 billion m$^3$ return in rivers to the oceans.

As an example, the land mass of the Federal German Republic (West Germany) has an annual rainfall of approximately 200 billion m$^3$. This represents the water supply for that country. Approximately 60 billion m$^3$ of that rain return in rivers to the oceans. After allowing for water evaporation and other losses only a fraction of the annual rainfall, about 16 billion m$^3$ is available for actual use and consumption. The current water requirements of West Germany cannot be fully supplied with that amount of water. It is therefore necessary to tap available ground water reserves.

The water consumption of industrial consumers doubles every 10 to 20 years. Based on the increasing demand and the constant water supply one can, therefore, expect catastrophic water shortages in West Germany within about 20 years.

Even today Western Europe as a whole uses three times as much water as is supplied by the natural water circulation. To supply the over-consumption, substantial portions of the ground water reservoirs are tapped, particularly in industrial countries. This resulted in a lowering of the ground water level to below what is reasonably justifiable.

River water used to supply part of the excess demand must be returned to the rivers in a sufficient quantity and, particularly, in a sufficiently clean condition to assure a continued ground humidity and porosity, and to maintain fish and other forms of water life. Further, it is necessary to maintain the navigability of rivers and to prevent a general deterioration of the environment.

In view of the above outlined conditions a sufficient water supply in the not too distant future requires that water clarification systems be improved. To accomplish this water clarification plants will have to be installed which are capable of cleansing large volumes of water to acceptable e.g. non-polluting levels. Unless this is accomplished, a substantial part of today's standard of living will soon be lost due to an insufficient water supply.

Since water cannot be fabricated and since the necessary efforts to treat water require extraordinary expenditures steps must presently be undertaken employing today's technology, which will prevent serious water shortages in the near future.

The river water that presently flows into the oceans is so polluted that it already represents a danger to the food supply for the oceanic fish stock.

Water and the natural water circulation are further stressed by waste waters from livestock operations, industry and private households. Large quantities of highly toxic heavy metals combinations are discharged by industry into surface waters and ultimately into oceans. In addition, these waters carry large quantities of solid industrial, agricultural and domestic waste products such as inert substances, dissolved fertilizers and pesticides, drainage waters from solid waste disposal sites, exhaust gas precipitations, sulphur ash and nitric oxide, residual petroleum products and petroleum distillation losses, accidentally spilled or liberated toxic substances, foaming detergents and the like. Pollution is further increased by the fact that water is a convenient transportation medium for the removal of these waste products.

The almost infinite forms and varieties of water pollution methods and possibilities, particularly by industry, cannot be eliminated with conventional means. This is especially applicable to water pollution with heavy metals which alter the life-sustaining equilibrium of the microbic environment in the water. Such pollution not only endangers but it destroys the self-cleansing ability of "living" waters by disturbing the equilibrium of the ecological interrelationships of such waters. The maximum pollution limits of potable water with toxic substances is already frequently exceeded. This applies especially to mercury and cadmium pollution of waters.

Today, it is customary to control the pollution of raw sewage, raw water, etc. hereinafter collectively referred to as waste water received in a holding tank or the like of a clarification plant by monitoring the biochemical oxygen requirement of the water. The effect of this practice is a limitation of the control to a relatively harmless form of contamination. More serious contamination, such as the above-described toxic and heavy metals pollution is normally not controlled; conventional clarification plants cannot effectively handle them.

Generally, prior art waste water clarification techniques attempt to achieve a more or less effective preclarification in a biologically activated zone to thereby reduce the pollutant content of the waste water. Thereafter, prior art systems seek to remove additional pollutants and to concentrate them in a filter sludge. The desired end result is clean water.

Especially in industrialized areas waste water received in clarification plants is often subjected to sudden surges in the concentration of the toxic substances and when these surges reach the biologically activated zone of the plant the result is a serious damage to and sometimes the destruction of the micro-organisms, thereby neutralizing the biologically activated zone. This is a problem that arises in every clarification plant that employs biological clarification techniques. It is therefore a clarification method which is not well-suited for use in industrialized regions or in areas of large livestock concentrations.

To overcome these problems it has recently been proposed to improve the life-supporting environment for the miroc-organisms in biological reaction zones by injecting pure oxygen. For clarification plants in industrialized regions this is of little help since the increased oxygen supply does not reduce the toxic effects of the waste water on the micro-organisms. In other words, such attempts attack the wrong aspect of the problem. It is the food supply for the micro-organisms, not their oxygen supply which is harmful to them.

Over the last decades a theory has developed which considers the usefulness of biological reaction zones in the water clarification as absolute. The zones are thought to remove from the water dissolved and suspended organic and inorganic materials in a separation or flocculation process which forms a product that can be separated. It employs chemical precipitation agents which are to cause a mineralization, that is which are to render dissolved substances hydrophobic.

It has been established that this process effects a considerable clarification of the water so long as the micro-organisms are not subjected to dangerous toxic substances. The clarification efficiency of the process decreases rapidly when heavy metal contaminations damage the micro-organisms and reduce their activity.

In a fully operable chemical-biological waste water clarification plant the separation product, so-called sludge is withdrawn from the reaction zones of the plant with a particle content of about 3%. This sludge is then dehydrated in a number of somewhat cumbersome steps, first by concentrating it in a well-known manner. This concentrator returns to the clarification plant highly polluted waste water. The concentrator in turn provides sludge with a particle concentration of from 5–10% which is then normally fed to another dehydration station, normally a filter press or centrifuge. Over the last decades the chamber filter press has become widely accepted. It effects a dehydration to a particle concentration of 30–40%. The filter press, however, operates quite uneconomically because the sludge is stocked with ash of previously burnt sludge to roughly double its volume. This process is known as the so-called sludge-ash process. The added ash is intended to facilitate the sludge dehydration in the press.

The sludge-ash method has the shortcoming that the added ash is subjected to a continuing grinding which ultimately reduces it to small dust particles which tend to clog the filter materials of the filter press. This in turn adversely affects the dehydration of the sludge mud in the press. This method further has economic drawbacks in that the added ash must first be cooled which results in a heat loss. Thereafter the ash is mixed with the sludge so that it is again hydrated. The mixing of the ash further requires the adding of chemical flocculation agents. This mixture is placed in the press, dehydrated and is then forwarded to the incinerator with a particle content of 30–40%. In the incinerator the earlier removed ash (50% of the material fed to the incinerator) must again be heated, from the residue one-half is again removed and added to fresh sludge about to be fed to the filter press. Thus, there is a continuous ash circulation which requires the repeated heating and cooling of ash in an amount of 50% of the total sludge volume fed to the incinerator.

Aside from the above discussed shortcomings of prior art chemical-biological waste water clarification plants, and there are other drawbacks not set forth herein, such plants are unable to filter from the waste water toxic contaminants in the form of water soluble heavy metals. The heavy metals dissolved in the water also represent a heavy stress on the recovered sludge. This is a primary reason why such systems cannot be employed in connection with agricultural applications.

It must also be noted that the chemical-biological waste water clarification is not well-suited for use in industrialized regions to effect a reliable treatment of the water because the heavy metal compounds cannot be filtered out and further because they kill or greatly reduce the micro-organisms which are necessary to effect the biological clarification process so that the latter can become inefficient or, at times, inoperative in a clarification plant.

In addition to the serious ecological deficiencies the installation and operation of such clarification systems require high capital investment and have extraordinarily high operating costs. According to official investigations the operating expenses of a chemical-biological clarification plant amount to approximately 20% of the capital costs. That means that such clarification plants not only fail to provide an operating profit, but they cause in addition thereto very high operating expenses. A large clarification plant in the area of Ludwigshafen (West Germany) is said to have yearly operating costs of about 70 million German marks.

In view of the unprofitability of chemical-biological clarification plants, industry cannot be expected to invest therein since their operation would destroy the basis for their existence. This applies especially to paper manufacturing and processing industries.

After considering the technological and economical characteristics of such clarification plants one must also consider the overall aspect of the water supply. For the above discussed reasons chemical-biological clarification methods are usually not able to effect a sufficient clarification of the water and in particular they are incapable of producing usable water. Consequently, the total fresh water required by industry, usually potable water, is returned to the rivers in a highly contaminated and insufficiently clean condition. This results in a serious interruption of the natural water circulation because the removed water is returned to the natural water circulation in an insufficiently cleaned state.

The resulting interruption of the ecological balance results in dead waters, a progressively increasing cost of future water clarification methods and systems and, in the end, to a catastrophy in the overall water supply.

SUMMARY OF THE INVENTION

The present invention eliminates the above discussed problems of waste water clarification plants in a simple and especially economical manner. In regard to both the biochemical oxygen requirement and the toxic and heavy metals pollution of waste waters the present invention produces excellently clean water which can be recirculated to industrial uses. The clarification plant of the present invention can be economically operated and produces a profit that not only covers operating costs but which can be used to amortize the initial capital requirements. In addition, a clarification plant constructed in accordance with the invention can be employed not only for the clarification of water but, in addition thereto, it can also process solid waste, including toxic waste which is generated in the region in which the plant is located.

A most important aspect of the present invention is the fact that carbon and in particular activated and non-activated carbon can be obtained from organic waste and clarification sludge removed from the waste water.

These carbons are employed in a two-stage filter as a mechanical carbon or roughing filter (first stage) and as an adsorption or fine filter (second stage).

By including a solid waste carbonizer it is possible to continuously regenerate saturated carbon and to replace within the system itself incinerated or otherwise lost carbon through the carbonization of organic substances.

It is well-known that activated carbon is expensive. It is, therefore, necessary to achieve maximum service times for its use as the adsorbent.

A feature of the present invention substantially prevents the clogging of activated carbon filter beds by correspondingly pretreating, that is by rough filtering the incoming waste water so that it is substantially free of floting and suspended particles. This gives the activated carbon filter a long, uninterrupted service time and makes it possible to periodically clean the activated carbon filter desorptively by simply backwashing it.

In accordance with the present invention this is accomplished by flowing the waste water through a suitable filter other than an activated carbon filter and preferably through a conventional, non-activated carbon filter. Such non-activated carbon is produced according to the present invention from organic waste products removed from the waste water.

Organic materials are deposited on the non-activated filter carbon during normal plant operation. The whole filter, including deposited organic residue is intermittently transported to a reactor of the clarification plant. There the filter is thermally regenerated by heating the carbon together with the organic residue thereon so that the latter is degassed and converted into additional filter carbon.

An important aspect of the present invention, further discussed below, is that it alters the overall position of industry in the ecological system of society.

At the present, industry is obligated to comply with stringent anti-pollution standards, that is industry is prohibited from discharging water that is contaminated or polluted beyond a preset level. In some instances, industry is further obligated to bear certain water clarification costs which are pegged to the contamination level of the discharged water.

This has led to very substantial differences of opinion as to whether it is more desirable to provide industrial growth or to maintain a clean and healthy environment. In the most recent past some politicians have stated that growth should be considered more important than the protection of the environment.

This conflict is primarily caused by the inability of public clarification plants to sufficiently cleanse waters irrespective of the degree to which they are contaminated. This in turn is a result of the fact that presently available waste water clarification plants and methods are frequently capable of cleansing domestic waste water only. As was shown earlier, such plants are frequently unable to handle industrial waste waters with their widely diverging contaminants.

The present invention solves these problems by providing a clarification system which:

1. Has an optimal clarification efficiency irrespective of the degree to which the waste water is contaminated. This applies to contamination from heavy metals as well as to contaminations of the waste water through detergents, herbicides, pesticides, chloride, phenol, tar oil, drilling oil, etc.;

2. Is able to accomodate variations in the concentration of toxic substances;

3. Is able to also process trash and solid waste which is generated in the region served by the plant; and 4. Is economically at least self-sustaining and, preferably, which generates a profit.

The present invention fulfills these requirements to a very high extent. In addition, it enables one to reclaim valuable materials from the solid and liquid waste.

Consequently, the present invention eliminates the need to tax industry to recover the cost of treating its waste waters. In contrast, for a clarification plant constructed in accordance with the present invention, it is desirable and advantageous to transport in the waste water as many organic contaminants as possible since they can be profitably utilized. Even garbage disposals for domestic or institutional, e.g. hotel, slaughter house, or hospital use, which in some regions have become prohibited, can again be used. This reduces the volume of solid waste that must be collected and discarded and employs waste water as the transportation medium for the waste. In the clarification plant such waste products are then removed from the waters and employed in a highly useful manner.

The economic consequence of the present invention is that especially industry, but also agriculture, e.g. large livestock operations, are no longer subject to growth limitations due to ecological considerations. Further, water clarification costs, which heretofore represented a heavy burden on industry, are substantially eliminated since organic substances discharged into the waste water are profitably processed in the clarification plant.

It is one of the objects of the present invention to recover the organic components of trash and waste water and to use them for the generation of heat, activated and non-activated carbon. To eliminate the unnecessary heating and handling of inorganic substances they must be separated from organic materials as early as possible. For this purpose, the present invention separates a trash and waste water mixture as fully as possible into floatable or suspendable organic substances, sinkable inorganic substances such as glass, metals, sand, pebbles and rocks, soil, etc., and water.

This is necessary because the organic substances in the trash and waste water represent valuable raw materials for the generation of activated and non-activated carbon since these substances are used to maintain the available filter carbon quantity and, in some instances, to even increase it.

To maximize the uninterrupted service life of the activated carbon filter it is intermittently backwashed to remove the deposited materials or residue through desorption. The need for completely regenerating the filter each time it must be cleansed is thereby eliminated. Thus, a greater operating efficiency is obtained.

Normally, the adsorption of contaminants requires relatively low process temperatures. The desorption of the same materials from the activated carbon, on the other hand, is best performed at elevated temperatures because such temperatures provide the particles to be desorped with greater kinetic energy.

Another aspect of the present invention therefore is to employ the adsorption and desorption characteristics of the filter to the greatest extent possible to provide such a filter with a high degree of operating efficiency.

Relatively hot exhaust gases from motors or boilers operated with combustible gas obtained from the carbonization of trash and/or the residue are generated in the clarification plant of the present invention. The present invention utilizes the thermal energy of such exhaust gases by transferring it to the backwash water for the desorptive cleansing of the activated carbon filter or filters.

In accordance with the present invention this is performed in a reservoir which holds sufficient clean water (or potable water) for the backwash operation. The water in the reservoir is heated with suitable means such as heating coils through which the warm motor or boiler exhaust gas is passed. Thermal energy from the gas is thereby transmitted to the water, warming the water and correspondingly cooling the exhaust gas. After completion of the backwash process the backwash water is placed in a second reservoir where it is cooled. Thereafter it is returned to the waste water intake of the overall clarification plant.

While no backwashing takes place the warm exhaust gases can be employed to preheat backwash water and/or it can be used for drying and/or carbonizing the organic waste as is more fully discussed below.

SHORT DESCRIPTION OF THE DRAWINGS

FIG. 1 schematically illustrates a water purification plant constructed in accordance with the present invention and shows a single filter bed only;

FIG. 2 schematically illustrates in cross-section the provision of a first, roughing filter bed of non-activated carbon followed by a second, fine filter bed of activated carbon located downstream of the first filter bed;

FIG. 3 is a schematic side elevational view of the portion of a clarification plant constructed in accordance with another embodiment of the present invention illustrating the manner in which trash and waste waters are combined and organic substances are separated from inorganic substances;

FIG. 4 is a plan view of the clarification plant portion illustration in FIG. 3;

FIG. 5 is a schematic plan view of a backwash system constructed in accordance with the present invention for backwashing activated carbon filters;

FIG. 6 is a schematic perspective view of the backwash system shown in FIG. 5; and FIGS. 7(a)-(c) are fragmentary side elevational views, in section, of the construction of the used backwash water return conduit.

DESCRIPTION OF THE PREFERRED EMBODIMENTS

The present invention simultaneously processes domestic and industrial trash and other solid waste including up to a certain extent toxic waste, produces energy, and clarifies waste water.

Referring to FIG. 1, a reactor 1 generates carbonization gas from organic substances, forms non-activated and activated carbon, and regenerates the latter. Combustible, e.g. organic solid trash floating on a water-trash mixture can be removed therefrom at outlet 16. It is placed into containers (such as filter containers 8) which are then transported to rotary combustion drums 4. During the transport dehydration zones or beds can be provided to remove excess water from the trash. The combustible substances are further dried with heat generated by reactor 1 in chambers 2 and 3 located above the reactor. Waste products applied to drums 4 are partially combusted and carbonized by correspondingly limiting the quantity of air that is fed to the reactor. The incomplete combustion of the substances under an oxygen deficiency forms a combustible carbonization gas. After the gas has passed a scubber it is transported to gas motors or turbines coupled to electric generators for producing electric energy.

For the production of activated carbon and non-activated carbon a predetermined mixture of organic substances is applied to a third rotary drum 5 of reactor 1. The mixture, a mash, is also predried in dehydration chambers 2 and 3 shown in FIG. 1.

The carbon or activated carbon produced in drum 5 is discharged via a suitable chute into a filter container 8 positioned at station 32. The just filled container is transported via a gravity conveyor 9 to station 10 from where it can be lowered into filter zone 23 of the clarification plant. A freshly lowered filter container 8 is illustrated at the downstreammost position (righthand side) of the filter zone. Waste water to be filtered flows to the right, as seen in FIG. 1, in a downstream direction through the filter zone.

A suitable hoist 11 intermittently advances each filter container in opposition to the water flow direction (to the left as shown in FIG. 1) to an upstreammost position adjacent a vertical hoist 24. With increasing contamination of the filter carbon in the container the latter is thus exposed to increasingly contaminated water as it moves to successively more upstream positions of the filter.

To subject the carbon filter containers to opposite water flow-through directions as they moved to successively more upstream positions water filter zone 23 includes baffle walls 25, 26 which permit water to alternatingly pass above and below, respectively, the baffle walls, so that the water flow direction through the filters is alternatingly upwards and downwards as is illustrated by the arrows 20. It will be observed that the water being filtered thus flows successively through a number of serially arranged filters before it is discharged. To increase capacity two or more filter container rows can be arranged side by side.

The filter containers have upright sidewalls 8a joined to water pervious end walls 8b. Means such as end flanges 8c is provided which suitably seal against baffle walls 25, 26 or the like to ascertain that no water bypasses a filter container. The containers further include means 8d (shown in the drawing on the containers at locations 19 and 31 only) for attaching them to conveying and hoisting equipment of the clarification plant.

A sand trap 13 precedes filter zone 23. In accordance with the present invention this sand trap simultaneously serves as a means for separating solid waste and as a gas washer or scrubber.

Ordinary domestic and industrial trash is dumped into a chute 27. From there the trash passes through a shredder 18 where it is reduced to relatively small particle sizes before it is combined with incoming waste water flowing through inlet conduit 7. The solid waste separator 13, constructed as a sand trap, is especially adapted for removing inorganic substances such as scrap metals, glass, etc. Organic substances suspended in or floating on the water surface are carried with the water towards solid waste outlet 16.

Inorganic substances separated in the area of sand trap 13 are removed therefrom by a suitable conveyor such as a bucket chain conveyor 12.

Exhaust gases from the generator turbine or motor are first recirculated to the interior of reactor 1 to utilize heat carried by the exhaust gases in drums 4 and 5. The gases are then withdrawn from the reactor interior via a pipe line 33 to a bell-shaped filter container cover 28. The bell cover closes the upper end wall 8z and seals against flange 8c of the filter container positioned on roll conveyor 19. The container was previously removed from the upstreammost filter position of filter 23 with hoist 24 and it was permitted to stand on conveyor to permit the water to drain from the container. For this purpose, conveyor 19 is above the water-trash mixture flow and constructed to permit water to drain through the conveyor directly into the water flow.

Exhaust gases flowing through pipeline 33 are forced through the container in a downward direction. A suitable bottom cover 14 closes the bottom end wall 8z of the filter container so that exhaust gases that have passed the filter container are withdrawn to an exhaust pipeline 15 and discharged into the waste water running through the solid waste separation zone 34. There the exhaust gases are finish scrubbed and cleansed.

Following the heating and drying with exhaust gas of the carbon in the filter container between top and bottom covers 28, 14 the container is moved to the left, as seen in FIG. 1, to a conveyor system 29 which engages the container and transports it, first vertically and then horizontally to a carbon discharge position 30 where the filter carbon and adhering residue is dumped from the container. The empty container is returned to a removal station 31 from where the container is transported to the filling station 32 below the rotary drum 5 by gravity conveyor 9. The carbon and active carbon removed from the container is discharged into rotary drum 5, is there regenerated and is thereafter discharged into the empty container at station 32 designated with the reference numeral 8.

It is apparent that the continuous addition of fresh organic substances from the waste water in the form of an organic residue deposited on the carbon in the filter containers 8 causes the production of excess carbon. This excess carbon is employed for the production of activated carbon in a second reactor (not shown) of the same construction. This second apparatus is a purely adsorptive water filter and performs the final filtration of the water in contrast to the system illustrated in FIG. 1 which is considered as a type of preclarification system. A preferred combination of the above-described scrubbing filter with an adsorption filter is described below. It is, of course, possible to supply the second clarification plant with activated carbon from reactor 1 illustrated in the drawing provided its capacity is efficient.

Referring to FIG. 2 there is schematically illustrated the serial arrangement of the first, roughing filter 23 followed by a second fine filter 35 stocked with activated carbon. Both are fitted with the above described removable filter containers (not shown in FIG. 2).

Incoming waste water flows through conduit 39 into the non-activated carbon filter bed 23. This filter extracts from the waste water floating and suspended particles through mechanical filtration. The activated carbon filter 35 disposed downstream of the non-activated filter 23 is separated therefrom by a wall 36 which defines a passage 37 for water from filter 23 to adsorption filter 35. The passage is disposed adjacent the bottom of the filter 23 so that all incoming waste water must first pass through the roughing filter. Consequently, water received by the adsorption filter includes only a minimum of suspended particles. In the second filter it is finish filtered and thereafter discharged as clarified water into outlet 38. Because of the minimal amount of floating and suspended particle received by the fine filter, it has an economically advantageous long, uninterrupted service time.

It is the object of the clarification plant to operate as economically as possible and to provide a continuous supply of activated carbon and non-activated carbon from the available waste products.

The present invention, therefore, provides for the intermittent circulation of the non-activated and activated filter carbon placed into the two filter zones for filtering the waste water. The carbons are intermittently removed, placed in a degassing and regeneration chamber and thereafter returned to the filter zone in their cleansed and activated condition, respectively. This assures an availability of the required carbon. The degassing of freshly received organic waste deposited on the filter carbon being regenerated is performed by utilizing heat generated in drums 4 which produce the incompletely burned gas for use by the generator turbines or motors.

Available carbon which is not needed in the filtration process because of the continuous carbon supply from carbonized organic substances is used for energy production in carbonization drum 4 and is there ultimately fully incinerated. Accordingly, all heavy metals which are received in the clarification plant from incoming waste are removed therefrom through adsorption in the activated carbon, and is ultimately removed from the system in the ash produced in drums 4.

The scrubbing of the exhaust gas 15 with incoming waste water, in addition to the gas cleansing in the filter containers between covers 14 and 28 results in a maximum cleansing of the exhaust gas before it is discharged. Contaminants which are transferred from the exhaust gas to the surrounding water are removed in filter zone 23 and are thus prevented from being discharged into the environment via the water. They are ultimately recovered as solid waste ash in the ash produced by drums 4.

Filter zone 23 includes a sludge removal system (not separately shown) which connects via a pump with the waste water intake so that sedimentation that forms in zone 23 is recirculated for subsequent removal in that same zone by the filter containers 8.

The present invention is a purely physical waste water clarification system which does not attempt to produce a clarification sludge as an initial separation product as is the case in prior art chemical-biological waste water clarification systems. Quite to the contrary, large particles, suspended materials, and dissolved substances are physically removed from the waste water by a carrier, the filter containers, which function as a transportation medium for filtrate by moving it with the containers to a degassing chamber. There the organic substances are degassed so that no independent separation product such as clarification sludge is formed.

Through the continuous resupply of organic substances, received through their entrapment in the filter zone, the available carbon volume is continuously increased. In the event that the received volume is insufficient the present invention provides an integrated solid waste disposal system from which sufficient organic substances can be extracted to produce the required carbon and activated carbon.

Referring to FIGS. 3 and 4, another construction of the portion of a clarification plant at which incoming trash and waste water are combined and classified is illustrated. Generally speaking, incoming waste water in a supply conduit 40 is directed into a mixing zone 41 for combination with suitably prepared trash. The mixture then flows into a sedimentation zone 42 where it is decelerated and thereafter into a filter zone (not shown in FIGS. 3 and 4).

A trash receptacle 43 is positioned immediately above the water intake and receives general domestic and/or industrial, organic substance containing trash. The trash is entrained through a chute 46 into the incoming waste water stream in the mixing zone 41. A rotary mixer 44 or the like, preferably positioned adjacent the bottom of the mixing zone, induces a counterflow in the trash-waste water mixture to achieve a thorough mixture of trash and water. In accordance with the present invention, air jets 45 are positioned at the floor of the mixing zone. The jets discharge pressurized air to increase the trash-waste water mixture and to enrich the water with oxygen. Magnetic bands 47 and/or submerged electromagnets (not separately shown) are positioned downstream of the mixing zone and serve to remove from the trash-water mixture ferrous metals. In the alternative, a magnetic band can be positioned in the immediate area of the trash intake chute 46 or directly within the trash receptacle 43.

Downstream of the mixing zone and the ferrous metal removal magnets is the sedimentation zone 42 in which floating or suspended organic substances are separated from the sinking inorganic materials, that is non-floatable or non-suspendable materials having a specific gravity larger than that of water. Trash floating to the surface of the water flow in the sedimentation zone, such as paper, wood products, tires, plastics, etc. is directed to a trash disintegrator and/or to the above discussed trash removal station (not shown in FIG. 3) in or a combination of both with suitably positioned diverter plates 50. In a preferred embodiment of the invention the trash disintegrator comprises a horizontally disposed blade wheel 48 located at the surface of the water-trash mixture flow and driven by a motor via a vertically arranged drive shaft. It will be noted that diverter plates 50 construct the floating trash stream to about the width of blade wheel 48 as is shown in FIG. 4. In the area of the disintegrator, an additional electromagnet can be provided for removing remaining metallic particles.

Inorganic substances, such as glass, sand, ground, metals, etc. settling at the bottom of the sedimentation tank are removed with a suitably constructed conveyor 51.

Thus, the total system produces waste water that only includes relatively small, organic trash particles which can be incinerated. The water enriched with such organic materials is fed to a non-activated carbon filter 23 (shown in FIG. 4 only) where the roughage and suspended particles added to the water are filtered out to form an organic filter residue for subsequent processing of the residue as above described.

Referring now to FIGS. 5–7 the trash-waste water mixture that has been pretreated as above described flows through a schematically illustrated suitable intake conduit 52. The intake conduit includes a reservoir 53 that can be closed from the intake conduit with a gate 54. Another gate 55 is provided to close intake conduit 52 to prevent a waterflow into filters 23 and 56 during the backwash operation. With gate 55 in the position closing conduit 52 the reservoir 53 serves as a temporary storage for incoming waste water. During normal plant operation gate 55 is open, water is filtered in the non-activated carbon filter 23 and the activated carbon filter 56 and fully cleansed water is discharged through outlet 62.

A backwash water container 57 is provided with a heating coil 58 for heating the backwash water with available thermal energy from the hot exhaust gases as above described. Backwash water is transported to the activated carbon filter 56 via a supply pipe 59. In the filter the backwash water leads to the desorption of particles deposited in the activated carbon. Used backwash water leaving the filter is directed to a cooling pool 60 via a pipe 61. After the backwash water in pool 60 has cooled it is returned to the waste water supply conduit 52 at 65 via a suitable flow conduit 63. The conduit is preferably longer than the distance between pool 60 and the point 65 at which the water is returned to incoming waste water by snaking the conduit, for example, as is shown in FIG. 5. In addition, the conduit preferably includes cascading sections 66 (see FIGS. 7a and b) which may include paddlewheels 67 or the like to aerate the water and help cool it to the intake water temperature. This is further facilitated by constructing conduit 63 relatively wide so that the water has a large exposed surface or by including turbulence inducing obstacles such as rocks 68 placed in the conduit as is shown in FIG. 7c.

The backwash water is taken from water that has already been filtered, e.g. from outlet 62 via a supply conduit 64 to container 57.

I claim:

1. A combined waste water clarification and trash disposal method comprising the steps of entraining trash including an organic substance in a waste water flow to form a waste water-trash mixture; agitating the mixture; decelerating the flowing mixture downstream of a point at which the mixture is agitated; retaining the mixture in its decelerated state for a sufficient length of time to permit materials having a specific gravity greater than water to settle to the bottom of the mixture flow; removing from the bottom materials that have settled out; providing a filter stocked with original filter carbon; flowing the mixture through the filter to remove trash particles and water contaminants from the mixture and form clarified water and a residue on the carbon including an organic substance; intermittently removing from the filter and regenerating at least part of the filter carbon by heating the filter carbon and the adhering residue under an oxygen deficiency to thereby degas organic residue substances and form additional filter carbon from such substances together with an incompletely burnt gas; thereafter intermittently replacing in the filter previously removed filter carbon and additional filter carbon freshly formed during the regenerating step from previously removed, adhering organic substances; and again flowing the mixture through the replaced filter carbon.

2. A method according to claim 1 including the steps of providing a second filter stocked with activated carbon and disposed downstream of the first mentioned filter, flowing filtrate from the first filter through the second filter to thereby remove from such filtrate remaining particulate matter and substances dissolved in the water, and thereafter discharging clarified water from the second filter, and intermittently backwashing the second filter with clarified water, the backwashing step including the steps of heating the clarified water above its normal temperature; passing the heated water in a backwash direction through the activated carbon of the second filter, and thereafter returning the backwash water to the mixture upstream of the second filter.

3. A method according to claim 2 including the step of cooling the backwash water to about the temperature of the mixture prior to the step of returning the backwash water to the mixture.

4. A method according to claim 3 wherein the returning step comprises the steps of flowing the backwash water in a non-laminar flow to the mixture upstream of the first carbon filter over an elongated path.

5. A method according to claim 4 including the step of forming with the backwash water flowing to the mixture at least one cascading flow.

6. A method according to claim 2 wherein the step of heating the backwash water comprises the step of directing clarified water into a container; passing relatively high temperature gas formed during the degassing of the organic residue substances through the water in the container to thereby heat the water, and thereafter discharging the gas.

7. A method according to claim 1 including the step of removing from the mixture prior to its introduction into the carbon filter some of the entrained trash; incinerating the trash in a reactor under oxygen deficiency to form an incompletely burnt, combustible gas; combusting the gas to generate usable energy; exhausting the gas after its combustion; and cleaning the gas prior to its discharge to the atmosphere by passing it through filter carbon intermittently removed from the filter prior to the step of heating such carbon to thereby pre-dry such carbon and remove particulate matters from the exhaust gas.

8. A method according to claim 7 including the step of flowing exhaust gas that has passed through the filter carbon into the water-trash mixture to effect a finish scrubbing of the gas, and thereafter discharging the gas to the atmosphere.

9. A method according to claim 1 wherein the filter is constructed of a plurality of individual filter elements stocked with filter carbon, at least some of the elements being serially arranged in the flow direction of the mixture through the filter so that the mixture sequentially contacts such filter elements, and including the steps of positioning the filter elements so that mixture flows vertically through them, and reversing the flow direction through each successive filter element.

10. A method according to claim 1 wherein the filter is constructed of a plurality of individual filter elements stocked with filter carbon, at least some of the elements being serially arranged in the flow direction of the mixture through the filter so that the mixture sequentially contacts such filter elements, and including the steps of intermittently advancing the filter elements in a direction opposite the mixture flow direction through the filter, removing the filter element disposed at the upstreammost position of the filter; and placing a filter element stocked with regenerated filter carbon at the downstreammost position of the filter; whereby filters are intermittently subjected to increasingly contaminated water as they advance in an upstream direction through the successive filter element positions of the filter.

11. A method according to claim 10 including the step of suspending above the mixture flow the filter element removed from the upstreammost position, and draining water from such filter element into the mixture flow.

12. A method according to claim 11 including the step of passing the drained filter element to a filter carbon regeneration station.

13. A system for the simultaneous clarification of waste water and the disposal of trash including organic substances comprising: a waste water inlet; a trash receptacle and means for entraining trash in incoming waste water to form a trash-waste water mixture; means for flowing the mixture in a downstream direction; a plurality of filter elements each stocked with filter carbon, at least some of the elements being serially arranged in the flow direction of the mixture through the filter so that the mixture contacts such elements sequentially for the filtration of the mixture and the removal therefrom of water contaminants so that clarified water is discharged therefrom each element being defined by a container holding filter carbon and having side walls and at least two water pervious end walls, and means for sealing portions of the side walls to a support structure for the container to positively direct the mixture flow through the filter carbon in the containers; means for intermittently moving the containers countercurrently to the mixture flow so as to first flow incoming mixture through containers holding filter carbon which is relatively contaminated; means for periodically removing filter carbon including a residue of contaminants adhering thereto; means for replacing removed filter carbon with clean filter carbon; and means for heating removed filter carbon and residue adhering thereto under an oxygen deficiency to de-gas and carbonize organic substances of the residue and generate a combustible gas; whereby the heating of the adhering residue causes the formation of additional filter carbon for replacing lost original filter carbon.

14. A system according to claim 13 including means for agitating the mixture immediately downstream of a point at which the trash in entrained in the waste water flow, and wherein the flowing means includes means disposed immediately downstream of the agitating means for decelerating the mixture flow to permit the sedimentation of inorganic substances to the bottom of the mixture flow.

15. A system according to claim 14 including means disposed at the bottom of the means for decelerating for the removal therefrom of inorganic matter that has settled at the bottom.

16. A system according to claim 13 wherein the means for intermittently moving the containers includes means for hoisting each element from the filter for replacement fo such element with another element.

17. A system according to claim 16 wherein the hoisting means includes means for advancing each element in an upstream direction relative to the flow direction of the mixture and for intermittently removing from the filter the element positioned at the upstreammost position of the filter.

18. A system according to claim 17 including means for transporting the filter element removed from the upstreammost position to the heating means for the regeneration of filter carbon and residue adhering thereto.

19. A system according to claim 18 wherein the heating means includes a heating drum for the regeneration of the filter carbon and the adhering residue, and including means for emptying the removed element by directing filter carbon and adhering residue from the removed element into the drum.

20. A system according to claim 19 including means for returning the emptied, removed element to a position disposed beneath the drum and for positioning such element so that it can receive fresh filter carbon, and means for flowing regenerated filter carbon from the drum into the last mentioned element.

21. A system according to claim 20 including means for hoisting the element stocked with regenerated carbon from beneath the drum to a downstreammost position in the filter to thereby replace a filter element previously removed from such position to the next upstream position of the filter.

22. A system according to claim 13 including baffle walls between each filter element in the filter for directing the mixture flow through the filter elements from a water pervious outlet end wall of one filter to a water pervious intake end wall of the filter element in the next downstream filter position.

23. A system according to claim 22 wherein the containers of the filter elements are generally upright containers and the end walls define tops and bottoms of the containers, and including means on such containers for attaching a sidewall thereof to a conveyor.

24. A system according to claim 13 including means for hoisting the filter containers from the filter, and means for temporarily positioning such containers vertically above the mixture flow through the system to enable such containers to drain.

25. A system according to claim 13 including cover means sealing against the container sidewalls for placement over the water pervious container end, and pipe means for passing hot gas from the heating means through the container to thereby dry filter carbon and residue adhering thereto and remove particulate matter from the gas.

26. A system according to claim 25 including further pipe means for directing gas that has passed the container into the mixture flow to effect a finish scrubbing of the gas prior to its release to the atmosphere.

27. A system according to claim 25 including means for combusting the gas before it is flowed through the container, and means for utilizing heat generated during the gas combustion.

28. A system according to claim 13 including cover means for each container end, and means for pressing the cover means against respective ends of the container sidewalls to effect a substantially gas-tight seal between the cover means and the sidewalls.

29. A system according to claim 13 including a plurality of jets discharging pressurized air into the mixture downstream of the point at which the trash is entrained in the waste water flow for agitating the mixture.

30. A system according to claim 13 including downstream of the point at which the trash is entrained in the waste water flow for agitating the mixture, a trash disintegrator positioned at the surface of the mixture flow downstream of the agitating means and having a plurality of blades rotating about a vertical axis, and means narrowing the width of the surface flow of the mixture to approximately the lateral extent of the blades to thereby guide all floating trash through the blades for disintegration.

31. A system according to claim 1 wherein the filter carbon comprises a non-activated carbon, and including an activated carbon filter disposed downstream of the non-activated carbon filter for the removal of contaminants remaining in the filtrate discharged by the first mentioned filter and for the removal of such contaminants from the filtrate, and means for discharging fully clarified water from the activated carbon filter.

32. A system according to claim 31 including means for backwashing the activated carbon filter with fully clarified water, means for heating the clarified water with gas generated by heating means before the water is used to backwash the activated carbon filter, and means for interrupting the mixture flow during the backwash operation.

33. A system according to claim 32 including a reservoir for receiving used backwash water, for holding the backwash water to permit it to cool to about the temperature of the water in the mixture, and including conduit means for flowing used backwash water from the reservoir back to the mixture upstream of the first mentioned filter.

34. A system according to claim 33 wherein the conduit means includes means for flowing the used backwash water in a direction opposite to the mixture flow over a distance greater than the distance between the point at which the backwash water is returned to the mixture flow and the point at which used backwash is discharged from the activated carbon filter to effect an increased cooling of the used backwash water in the conduit means.

35. A combined waste water clarification and trash disposal method comprising the steps of entraining trash including an organic substance in a waste water flow to form a waste water trash mixture; providing a filter stocked with original filter carbon; flowing the mixture through the filter to remove trash particles and water contaminants from the mixture and form clarified water and a residue on the carbon including an organic substance; intermittently removing from the filter and regenerating at least part of the filter carbon by heating the filter carbon and the adhering residue under an oxygen deficiency to thereby degas organic residue substances and form additional filter carbon from such substances together with an incompletely burnt gas; thereafter intermittently replacing in the filter previously removed filter carbon and additional filter carbon freshly formed during the regenerating step from previously removed, adhering organic substances; again flowing the mixture through the replaced filter carbon; providing a second filter stocked with activated carbon and disposed downstream of the first mentioned filter; flowing filtrate from the first filter through the second filter to thereby remove from such filtrate remaining particulate matter and substances dissolved in the water; thereafter discharging clarified water from the second filter; and intermittently backwashing the second filter with clarified water, the backwashing step including the steps of heating the clarified water above its normal temperature; passing the heated water in a backwash direction through the activated carbon of the second filter, and thereafter returning the backwash water to the mixture upstream of the second filter.

36. A method according to claim 35 including the step of cooling the backwash water to about the temperature of the mixture prior to the step of returning the backwash water to the mixture.

37. A method according to claim 36 wherein the returning step comprises the steps of flowing the backwash water in a non-laminar flow to the mixture upstream of the first carbon filter over an elongated path.

38. A method according to claim 37 including the step of forming with the backwash water flowing to the mixture at least one cascading flow.

39. A method according to claim 35 wherein the step of heating the backwash water comprises the step of directing clarified water into a container; passing relatively high temperature gas formed during the degassing of the organic residue substances through the water in the container to thereby heat the water, and thereafter discharging the gas.

40. A combined waste water clarification and trash disposal method comprising the steps of entraining trash including an organic substance in a waste water flow to form a waste water trash mixture; providing a filter stocked with original filter carbon; removing from the mixture prior to its introduction into the carbon filter some of the entrained trash; incinerating the trash in a reactor under oxygen deficiency to form an incompletely burnt, combustible gas; combusting the gas to generate usuable energy; exhausting the gas after its combustion; cleaning the gas prior to its discharge to the atmosphere by passing it through filter carbon intermittently removed from the filter prior to the step of heating such carbon to thereby pre-dry such carbon and remove particulate matters from the exhaust gas; flowing the mixture through the filter to remove trash particles and water contaminants from the mixture and form clarified water and a residue on the carbon including an organic substance; intermittently removing from the filter and regenerating at least part of the filter carbon by heating the filter carbon and the adhering residue under an oxygen deficiency to thereby degas organic residue substances and form additional filter carbon from such substances together with an incompletely burnt gas; thereafter intermittently replacing in the filter previously removed filter carbon and additional filter carbon freshly formed during the regenerating step from previously removed, adhering organic substances; and again flowing the mixture through the replaced filter carbon.

41. A method according to claim 40 including the steps of agitating the mixture after the entrainment of the trash in the waste stream; decelerating the flowing mixture downstream of a point at which the mixture is agitated; retaining the mixture in its decelerated state for a sufficient length of time to permit materials having a specific gravity greater than water to settle to the bottom of the mixture flow; and removing from the bottom materials that have settled out.

42. A method according to claim 40 including the step of flowing exhaust gas that has passed through the filter carbon into the water trash mixture to effect a finish scrubbing of the gas, and thereafter discharging the gas to the atmosphere.

43. A combined waste water clarification and trash disposal method comprising the steps of entraining trash including an organic substance in a waste water flow to form a waste water trash mixture; providing a filter constructed of a plurality of individual filter elements stocked with orginal filter carbon; flowing the mixture through the filter to remove trash particles and water contaminants from the mixture and form clarified water and a residue on the carbon including an organic substance; at least some of the elements being serially arranged in the flow direction of the mixture through the filter so that the mixture sequentially contacts such filter elements; positioning the filter elements so that mixture flows vertically through them; reversing the flow direction through each successive filter element; intermittently removing from the filter and regenerating at least part of the filter carbon by heating the filter carbon and the adhering residue under an oxygen deficiency to thereby degas organic residue substances and form additional filter carbon from such substances together with an incompletely burnt gas; thereafter intermittently replacing in the filter previously removed filter carbon and additional filter carbon freshly formed during the regenerating step from previously removed, adhering organic substances and again flowing the mixture through the replaced filter carbon.

44. A method according to claim 43 including the step of intermittently advancing the filter elements in a direction opposite the mixture flow direction through the filter, removing the filter element disposed at the upstreammost position of the filter; and placing a filter element stocked with regenerated filter carbon at the downstreammost position of the filter; whereby filters are intermittently subjected to increasingly contaminated water as they advance in an upstream direction through the successive filter element positions of the filter.

45. A method according to claim 44 including the step of suspending above the mixture flow the filter element removed from the upstreammost position, and draining water from such filter element into the mixture flow.

46. A method according to claim 45 including the step of passing the drained filter element to a filter carbon regeneration station.

* * * * *